3,534,058
SULFONYLPYRAZOLES

Arthur A. Santilli, Havertown, Del., and Thomas S. Osdene, Richmond, Va., assignors to American Home Products Corp., New York, N.Y., a corporation of Delaware
No Drawing. Continuation-in-part of application Ser. No. 529,190, Feb. 23, 1966. This application Feb. 27, 1968, Ser. No. 708,515
Int. Cl. C07d 49/20, 49/18
U.S. Cl. 260—310          4 Claims

ABSTRACT OF THE DISCLOSURE

A number of 3-amino or 3-phenyl-4-sulfonylpyrazoles have been prepared by reacting a 3-ethoxy acrylonitrile or acrylophenone with hydrazine. The pyrazoles thus formed have been found to be pharmacologically active, demonstrating central nervous system depressant and anti-convulsant activity.

---

This application is a continuation-in-part of our application, Ser. No. 529,190, filed Feb. 23, 1966, now abandoned.

This invention relates to selected sulfonylpyrazoles having pharmacological utility and to methods for their preparation.

More particularly, this invention trelates to 3,4-disubstituted sulfonylpyrazoles represented by the general formula:

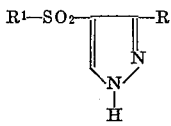

wherein R stands for phenyl or an amino radical while $R^1$ is intended to represent a lower alkyl, phenyl or substituted phenyl. Contemplated substituents in the phenyl ring are lower alkyl and halogen, preferably chlorine. Included with the aforesaid pyrazoles deemed to be patentable are the non-toxic, pharmaceutically acceptable acid-addition salts.

The compounds sought to be patented have been found, under scientifically acceptable testing conditions, to be pharmacologically active, showing utility as central nervous system agents and are thus useful in the field of experimental pharmacology. These compounds, under said tests, specifically demonstrate depressant and anti-convulsant action.

The preparation of the compounds described above may be carried out in good yield by reacting a 3-ethoxy-2-sulfonyl acrylonitrile or acrylophenone with hydrazine in a solvent, suitably ethanol, at the refluxing temperature of the mixture. After completion of the reaction, the solvent is removed and the desired product is crystallized out of the residual materials. To form the desired acid-addition salt, one merely reacts the base in a suitable solvent with the selected acid in known manner. Pharmaceutically acceptable acids are known, among which may be mentioned hydrochloric, sulfuric, phosphoric, acetic, tartaric, maleic, fumaric, citric, etc.

The 3-ethoxy acrylonitrile or acrylophenone starting reactants are known compounds and available commercially or may be prepared by utilizing recognized reactions known to the art. One procedure is outlined as follows:

A selected thio, for example, an aliphatic or aromatic mercaptan is reacted with a haloacetophenone or haloacetonitrile at about 10–20° C., in the presence of an alkali metal activating agent, for example, sodium. This forms a thioacetophenone or nitrile. The reaction product is then reacted with hydrogen peroxide in a glacial acetic acid medium forming the corresponding sulfonyl compound. The latter may then be reacted with triethyl orthoformate in glacial acetic acid at reflux temperatures, producing the aforesaid 3-ethoxy-2-sulfonyl-acrylonitrile or acrylophenone starting compounds.

The following examples illustrate the preparation of selected compounds of the invention:

EXAMPLE 1

3-amino-4-(p-chlorophenylsulfonyl)pyrazole

To a solution of 5.4 g. of 2-(p-chlorophenylsulfonyl)-3-ethoxy acrylonitrile in 25 ml. of ethanol was added 10 ml. of 85% hydrazine. The reaction mixture was heated under reflux for 10 minutes and was then cooled for 12 hours in the refrigerator. Upon removal of the solvent in vacuo on a rotary evaporator there remained an oily residue which upon trituration with water crystallized. The solid amounted to 4.2 g., M.P. 132–142° C. Several recrystallizations from aqueous ethanol gave the analytical sample, M.P. 155–156° C.

Analysis.—Calc'd (percent): C, 41.95; H, 3.13; N, 16.31; Cl, 13.76; S, 12.44. Found (percent): C, 41.95; H, 3.04; N, 16.31; Cl, 14.1; S, 12.3.

In the same manner as disclosed in Example 1, but replacing the 3-ethoxy 2-sulfonyl acrylonitrile with selected acrylonitriles, one may prepare the following compounds falling within the ambit of the structural formula given above:

3-amino-4-(benzenesulfonyl)pyrazole
3-amino-4-(p-tolylsulfonyl)pyrazole
3-amino-4-(methylsulfonyl)pyrazole

EXAMPLE 2

4-methylsulfonyl-3-phenylpyrazole

To a solution of 3.8 g. of 3-ethoxy-2-methylsulfonyl-acrylophenone in 25 ml. of absolute ethanol was added 0.6 g. of 95% hydrazine. The reaction mixture was heated under reflux on the steam bath for 1 hour after which time the solvent was removed in vacuo on a rotary evaporator. The pasty solid residue was recrystallized from benzene affording 2.4 g. of product, M.P. 115–117° C. A second recrystallization from benzene gave the analytical sample, M.P. 116–117.5° C.

Analysis.—Calc'd (percent): C, 54.05; H, 4.54; N, 12.61; S, 14.42. Found (percent): C, 54.13; H, 4.54; N, 12.38; S, 14.0.

Utilizing other alkylsulfonyl acrylophenones, the following compounds may be prepared by following the same procedure as disclosed in the preceding Example 2:

4-ethylsulfonyl-3-phenylpyrazole
4-butylsulfonyl-3-phenylpyrazole
4-benzenesulfonyl-3-phenylpyrazole
3-phenyl-4-(p-tolylsulfonyl)pyrazole
4-(phenylsulfonyl)-3-(o-tolyl)pyrazole
3-(p-chlorophenyl)-4-methylsulfonyl pyrazole
3-(p-bromophenyl)-4-(p-chlorophenylsulfonyl)pyrazole In evaluating the compounds under known experimental pharmacological conditions, the following test procedures were used.

The compound, at graded dose levels, e.g. 12.7; 40.0; 127 and 400 mg./kg., is administered orally to groups of six mice. One hour later, the animals are given a supramaximal electroshock through corneal electrodes (25 ma., .02 sec.). Presence or absence of tonic extensor seizures as well as the number of deaths are recorded.

The above test will indicate whether the test compound has central nervous system activity as an anti-convulsant agent. Another test, useful to corroborate anti-convulsant activity is as follows:

The compound is administered orally to groups of six mice (three males and three females). One hour later, the animals are challenged with metrazol 125 mg./kg., i.p. The incidence of clonic and tonic convulsions and deaths is observed for one-half hour. Protection against convulsions and death is determined by comparison with controls run simultaneously.

The compounds of the invention, when used as described hereinabove, demonstrated anti-convulsant activity in the dosage range of 12.7 to 400 mg./kg. with a common $ED_{50}$ in the neighborhood of about 100 mg./kg.

The compounds may be used with or without a carrier or excipient, either in dry tablet or pellet form for oral use; or in a liquid carrier when parenteral use is desired. While the compounds of the invention are useful in experimental pharmacology, it is also contemplated that they could be useful in veterinary medicine, for example, in prevention of convulsions or fits.

The invention claimed is:
1. A compound selected from the group consisting of a base having the formula:

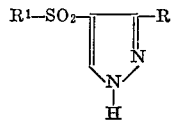

wherein R is a member of the group consisting of amino and phenyl, while $R^1$ is a member of the group consisting of lower alkyl, phenyl, (lower)alkylphenyl and chlorophenyl; and the non-toxic acid-addition salts thereof.

2. A compound of claim 1, wherein R is amino or phenyl, while $R^1$ is methyl or chlorophenyl.

3. As a compound of claim 1; 3-amino-4-(p-chlorophenylsulfonyl)pyrazole.

4. As a compound of claim 1; 4-methylsulfonyl-3-phenylpyrazole.

References Cited

UNITED STATES PATENTS

| | | |
|---|---|---|
| 2,989,539 | 6/1961 | Anderson et al. |
| 3,294,640 | 12/1966 | Wolf _____ 424—273 |

OTHER REFERENCES

Bertrand et al., Chem. Abst., vol. 64, col. 19592 (1966).
Beyer et al., Chem. Abst., vol. 54, cols. 3386–7 (1960).
Cowell et al., Jour. Chem. Soc. (London), 1963, pp. 4920–4.
Dorn et al., Chem. Abst., vol. 64, cols. 8167–8 (1966).
Fusco et al., Tetrahedron Letters, 1966 (16), p. 1741 relied on.
Grothaus et al., Chem. Abst., vol. 30, col. 6736 (1963).
Pain, Jour. Chem. Soc. (London), 1963, pp. 1332–3.

NATALIE TROUSOF, Primary Examiner

U.S. Cl. X.R.

260—465, 465.6, 590